Figure 1:
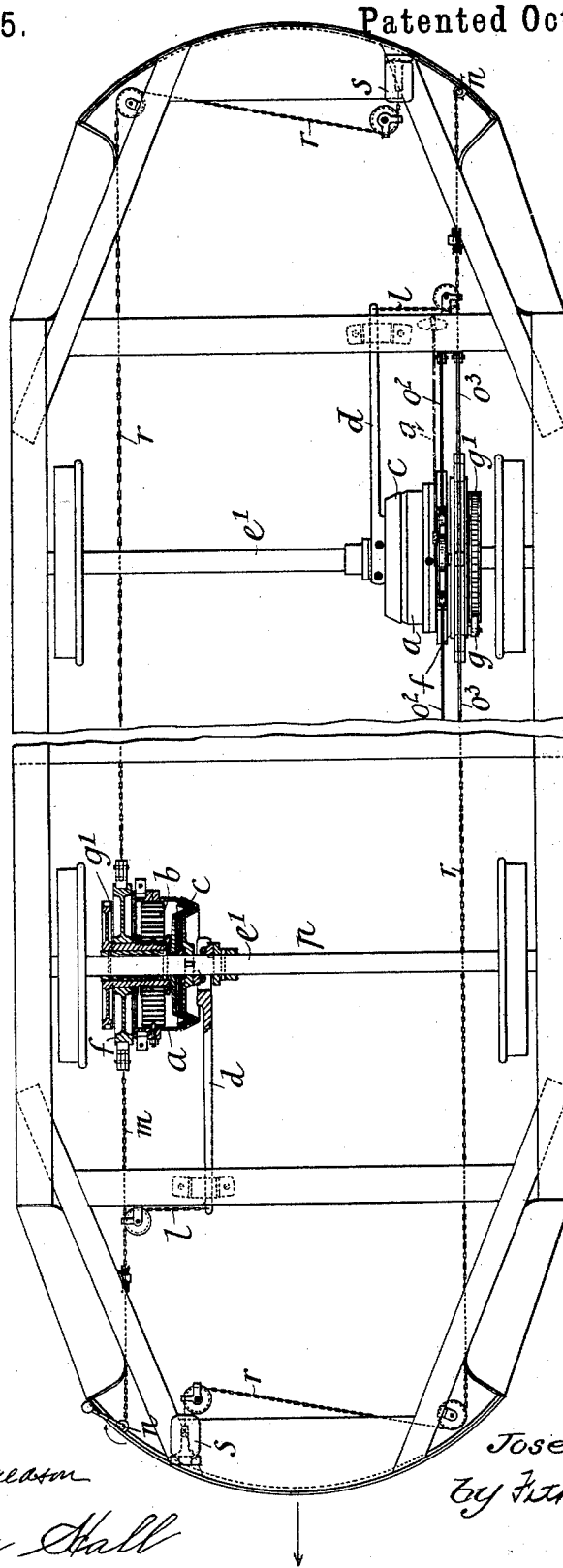

(No Model.) 4 Sheets—Sheet 1.

J. W. LEE.
VEHICLE STARTER.

No. 485,125. Patented Oct. 25, 1892.

Witnesses
Inventor.
Joseph W. Lee
By Fetherstonhaugh & Co
Attys.

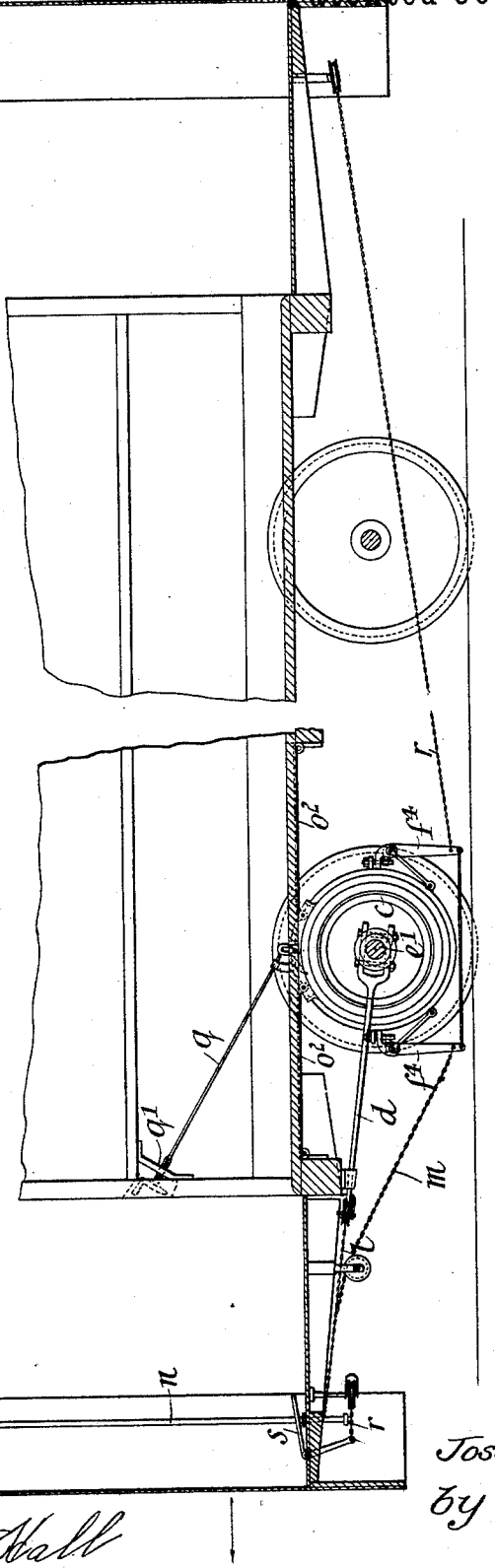

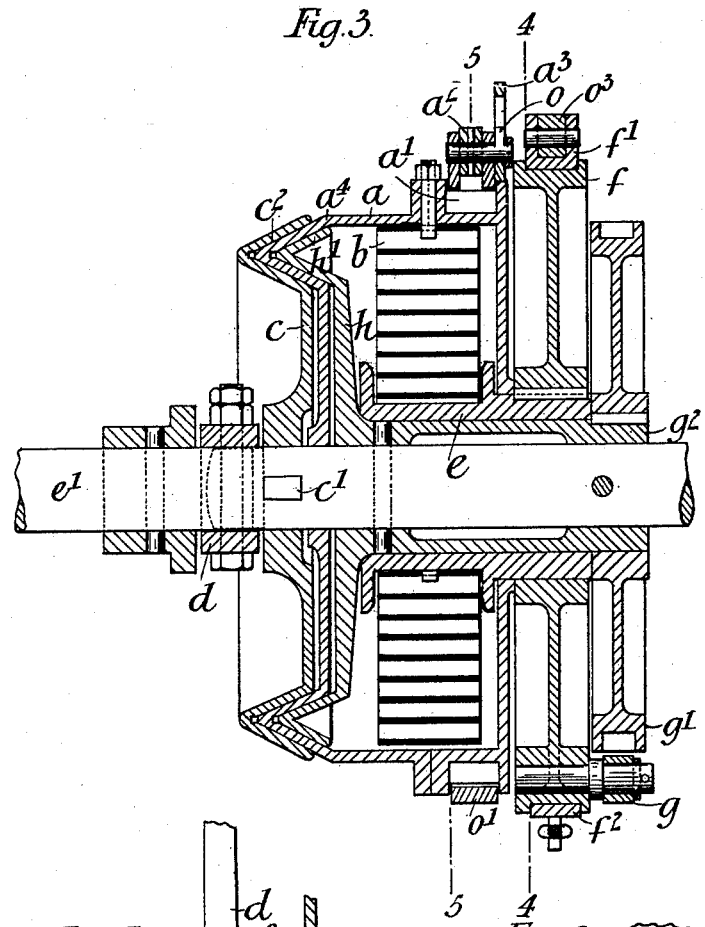
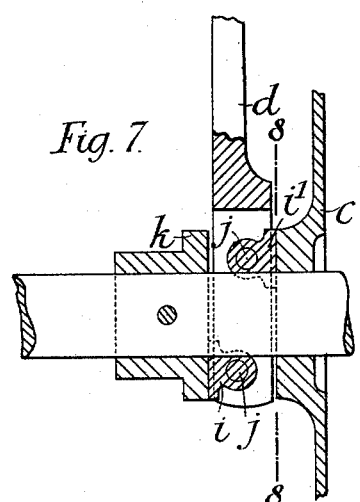
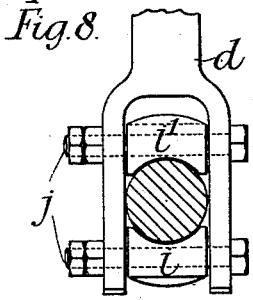

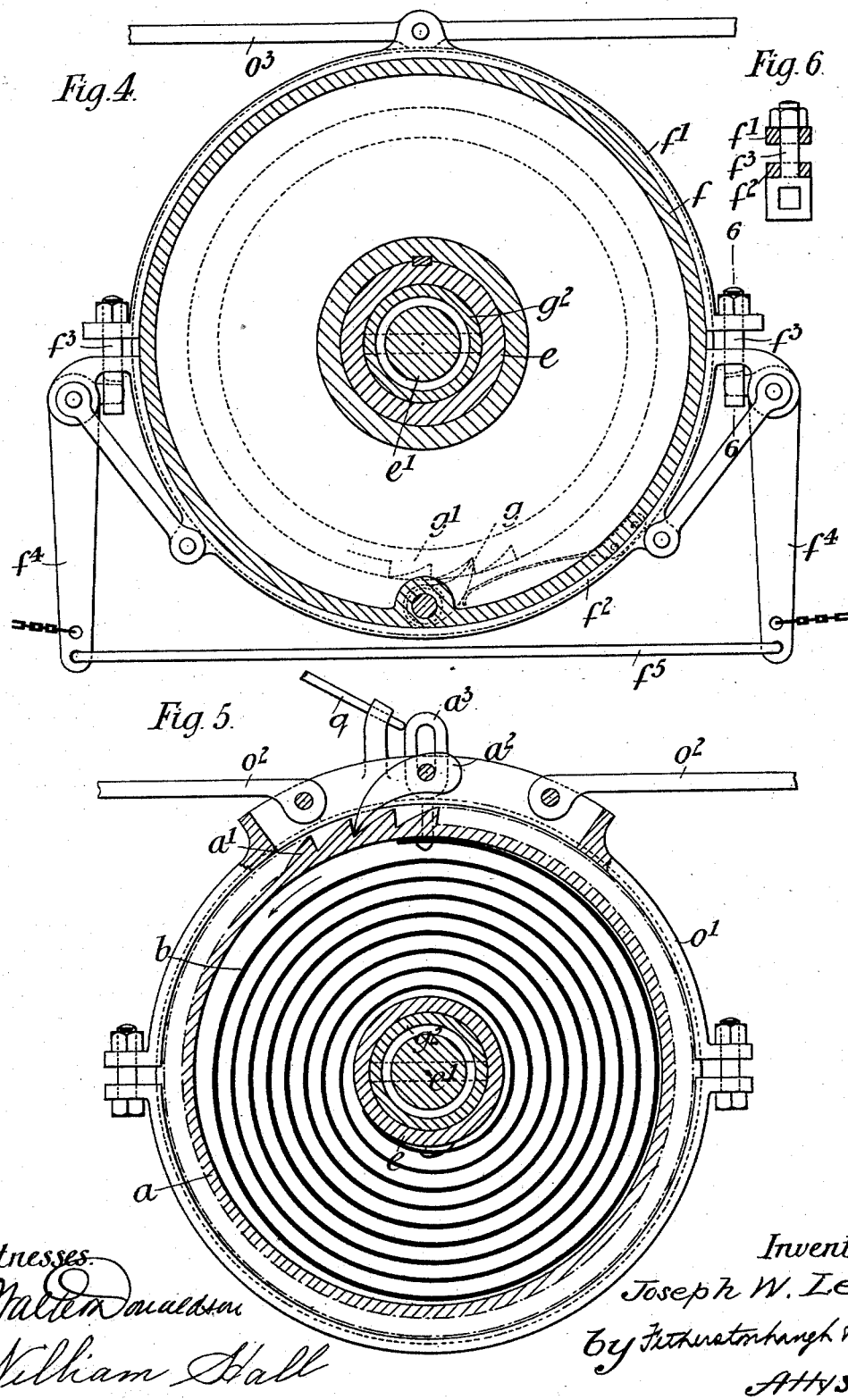

UNITED STATES PATENT OFFICE.

JOSEPH WILLIAM LEE, OF CAMBRIDGE, ASSIGNOR OF ONE-HALF TO SAMUEL BURLINGHAM, OF HITCHIN, ENGLAND.

VEHICLE-STARTER.

SPECIFICATION forming part of Letters Patent No. 485,125, dated October 25, 1892.

Application filed March 10, 1892. Serial No. 424,419. (No model.)

*To all whom it may concern:*

Be it known that I, JOSEPH WILLIAM LEE, a subject of the Queen of Great Britain, residing at Cambridge, England, have invented new and useful Improvements in Apparatus for Facilitating the Stopping and Starting of Tramway and other Vehicles, of which the following is a specification.

My invention relates to improvements in apparatus of the kind described in the specification of British Letters Patents No. 17,977, of 1889, for storing the energy of momentum of tram-cars when being brought to a standstill, and for utilizing such energy for again starting the car, and has, mainly, for its object to so construct the apparatus that the countershaft and the gear-wheels operating in connection therewith, and described in the said former specification, can be dispensed with.

In carrying out my invention I attach the inner end of the spring in the spring-drum to a boss or sleeve loose on the axle of the car, the said boss having attached thereto a brake-pulley or other suitable means, which can be operated to prevent the said end of the spring from revolving. The said brake-pulley is provided with a pawl or catch, which engages with a ratchet-wheel keyed on the axle.

As described in the said former specification, the outer end of the spring is attached to the drum and the said drum is provided with ratchet-teeth having engaging therewith of a pawl or catch connected to the frame the car. Instead of arranging the friction-disk, which is adapted to engage with the face of the spring-drum, loose on the axle, as in the said specification, I attach it thereto, and to support the drum against the thrust of the said disk I employ a flanged boss or disk fixed to the axle. The mechanism for engaging the said disk with the spring-drum and for applying the brake to the brake-pulley are advantageously connected together, so as to allow of their being operated simultaneously.

To enable the car or other vehicle to be driven in either direction, two of the apparatuses hereinbefore described are used, one in connection with each axle, as in the said former specification, the pawl of the spring-drum not in use being disengaged therefrom. I arrange, however, that in cases of emergency one apparatus can assist the other to stop the car. For this purpose I employ additional means for applying the brake to the brake-pulley or the like of the apparatus not in use.

To enable my invention to be fully understood I will describe the same by reference to the accompanying drawings, in which—

Figure 1 is a plan of the under frame and wheels of a tram-car provided with two apparatus constructed according to my invention, one of which apparatus is shown in section. Fig. 2 is a longitudinal vertical section of the same. Fig. 3 is a vertical section of one of the said apparatus and parts connected therewith, drawn to an enlarged scale; and Figs. 4 and 5 are respectively sections on the lines 4 4 and 5 5 of Fig. 3. Fig. 6 is a section on the line 6 6 of Fig. 4. Fig. 7 is a section showing an axle and a portion of one of the levers for causing the outer ends of the spring in the spring-drum of each apparatus to rotate with the said axle. Fig. 8 is a section on the line 8 8 of Fig. 7.

Each apparatus comprises a spring-drum $a$, containing and having secured thereto one end of a spring $b$ and adapted to engage frictionally with a disk $c$ by means of a lever $d$.

$a'$ are ratchet-teeth in the drum $a$ $a^2$, the pawl engaging therewith, and $a^3$ the slotted piece for lifting the pawl out of the said teeth, all of which parts are similar to those described in the specification of the said former Letters Patent.

$e$ is the boss or sleeve, to which the inner end of the spring is attached, the said boss being loose on the axle $e'$ and having attached thereto what I term a "double-lever brake-pulley arrangement" consisting of the pulley $f$, which is encircled by straps $f'$ $f^2$, adapted to be tightened on the pulley $f$ by either of the slotted bolts $f^3$ and bell-crank levers $f^4$, as shown clearly in Fig. 4, for the purpose of preventing the said inner end of the spring $b$ from revolving with the axle.

$f^5$ is an india-rubber or other spring connecting the levers $f^4$ together.

$g$ is the pawl or catch on the pulley $f$, and $g'$ is the ratchet-wheel keyed on the axle $e'$ through the medium of the boss $g^2$ and engaging with the said pawl.

Each disk $c$ is attached to the axle by the key $c'$, but can slide longitudinally thereon to allow of its V-groove $c^2$ being pressed into engagement with the V-shaped projection $a^4$ on the drum $a$ by the lever $d$, so that the movement of the axle can be imparted to the outer end of the spring $b$.

$h$ is the flange or disk forming a part of the boss $g^2$ and serving to receive the thrust of the disk $c$ when pressed into engagement with the projection $a^4$ on the drum $a$, the said disk $h$ being provided with a V-shaped projection $h'$, designed to enter and fit the groove forming the interior of the projection $a^4$.

Each lever $d$ is forked at one end, so as to embrace the axle and support pads $i\ i'$, fitting on bolts $j\ j$, the pad $i$, when the lever is moved in one direction, serving as a fulcrum for the lever by bearing against a collar $k$ on the axle, while the pad $i'$ serves to press the disk $c$ into engagement with the drum $a$.

Chains $l\ m$ connect the lever $d$ and one of the brake-levers $f^4$, respectively, of each apparatus to the usual brake-shaft $n$, so that they can be operated simultaneously.

Instead of arranging each slotted piece $a^3$ to act upon a pin on its pawl $a^2$, as in the specification of the said former patent, I provide the pivot-pin of the pawl with an extension $o$, adapted to engage with the slot in the piece $a^3$ in such a manner that the pawl is compelled to turn with the said piece $a^3$, but at the same time the latter is free to bear upon the flange of the spring-drum. The pawl $a^2$ is advantageously carried in a ring $o'$, encircling the ratchet-teeth $a'$ and connected with the framing of the car by rods $o^2$, which allow of the vertical movement of the said framing on the car-springs without interfering with the action of the said pawl. The brake-straps $f'\ f^2$ are similarly connected to the framing of the car by rods $o^3\ o^3$.

The operation is as follows: Assuming the car to be moving in the direction of the arrows, Figs. 1 and 2, in which case the apparatus in connection with the axle indicated at $p$ will be made use of, the brake-shaft $n$ being revolved in the direction of the arrow, Fig. 2, the brake-straps $f'\ f^2$ and the lever $d$ will be operated and the straps $f'\ f^2$ will stop the brake-pulley $f$, and consequently the rotation of the inner end of the spring in the spring-drum, and the lever $d$ will cause the disk $c$ to be forced into engagement with the spring-drum $a$, so that the outer end of the said spring will by reason of the momentum of the car continue to revolve with the drum until the spring is wound up. At the same time the drum $a$ and ratchet-wheel $g'$ will, respectively, overrun the pawls $a^2$ and $g$. The spring having been thus wound up, when the car is to be restarted it is only necessary to release the handle of the brake-shaft $n$, whereupon the drum $a$ and pulley $f$ will be freed, respectively, from the axle and brake-straps $f'\ f^2$, and the car will be moved again in the direction of the arrows by the uncoiling of the spring $b$, rotating the axle through the medium of the ratchet-wheel $g'$, pawl $g$, brake-pulley $f$, and boss $e$, the drum $a$ being prevented from turning in a contrary direction by the pawl $a^2$. Each apparatus has a screwed rod $q$ working through a nut $q'$ for the purpose of lifting the pawl $a^2$ of the spring-drum not in use by impinging against and moving the slotted piece $a^3$ of the said pawl. The bell-crank lever $f^4$, which is unconnected to the brake-shaft $n$ of each apparatus, is connected by a chain $r$ to a foot-lever $s$ at the opposite end of the car, so that in cases of emergency one brake-pulley can assist the other to stop the car.

Instead of the pawl or catch $a^2$ and ratchet-teeth on the spring-drum, I may employ a wedge engaging with a correspondingly-shaped groove in the drum.

Having now particularly described and ascertained the nature of my said invention and in what manner the same is to be performed, I declare that what I claim is—

1. Apparatus for storing the energy of momentum of tramway and other vehicles, comprising a spring located within and having its outer end attached to a drum loose on the shaft or axle carrying it, the other end of the spring being attached to a boss or sleeve, also loose on the shaft or axle, and means for preventing the rotation of the boss or sleeve for connecting the drum with the shaft, so that the spring will be wound up by the movement of the vehicle and for releasing the spring and holding the drum stationary, substantially as and for the purpose hereinbefore described.

2. In combination with the spring-drum of a friction-clutch adapted to engage therewith, a boss or sleeve loose on the axle, the inner end of the spring being attached thereto, a brake-pulley on the boss, brake-straps with operating connections, and a ratchet-wheel on the axle engaged by a pawl on the brake-pulley, substantially as described.

JOSEPH WILLIAM LEE.

Witnesses:
   G. F. REDFERN,
   JOHN E. BONFIELD,
*Of the firm of G. F. Redfern & Co., 4 South Street, Finsbury, London, Patent Agents.*